United States Patent
Takeda et al.

(10) Patent No.: US 10,628,933 B2
(45) Date of Patent: Apr. 21, 2020

(54) INSPECTING APPARATUS AND LASER PROCESSING APPARATUS

(71) Applicant: DISCO CORPORATION, Tokyo (JP)

(72) Inventors: Noboru Takeda, Tokyo (JP); Hiroshi Morikazu, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 103 days.

(21) Appl. No.: 15/440,686

(22) Filed: Feb. 23, 2017

(65) Prior Publication Data

US 2017/0243341 A1    Aug. 24, 2017

(30) Foreign Application Priority Data

Feb. 24, 2016 (JP) ................................ 2016-032883

(51) Int. Cl.
| | |
|---|---|
| *G06T 7/00* | (2017.01) |
| *G01N 21/95* | (2006.01) |
| *B23K 26/03* | (2006.01) |
| *G01N 21/958* | (2006.01) |
| *B23K 26/53* | (2014.01) |
| *H04N 5/225* | (2006.01) |
| *B23K 103/00* | (2006.01) |

(52) U.S. Cl.
CPC .......... *G06T 7/0004* (2013.01); *B23K 26/032* (2013.01); *B23K 26/53* (2015.10); *G01N 21/9501* (2013.01); *G01N 21/958* (2013.01); *H04N 5/2256* (2013.01); *B23K 2103/56* (2018.08); *G01N 2201/12* (2013.01); *G06T 2207/10004* (2013.01); *G06T 2207/30148* (2013.01)

(58) Field of Classification Search
CPC ................. G06T 7/0002; G06T 7/0004; G06T 2207/30148; G01N 21/9505; G01N 21/9506; G01N 21/95; G01N 21/9501; H04N 5/2256
See application file for complete search history.

(56) References Cited

U.S. PATENT DOCUMENTS

| | | | | |
|---|---|---|---|---|
| 5,389,182 A | * | 2/1995 | Mignardi | ............ B81C 1/00896 156/701 |
| 2004/0207836 A1 | * | 10/2004 | Chhibber | ........... G01N 21/4738 356/237.4 |

(Continued)

FOREIGN PATENT DOCUMENTS

JP    2012-195472    10/2012

OTHER PUBLICATIONS

DF198 MicroBrite Series Ring Lights (Specification), Jul. 15, 2015, Advanced Illumination, p. 1; https://www.advancedillumination.com/wp-content/uploads/2018/09/DF198_Specification-Sheet.pdf (Year: 2015).*

*Primary Examiner* — Francis Geroleo
*Assistant Examiner* — Christopher Kingsbury Glover
(74) *Attorney, Agent, or Firm* — Greer Burns & Crain, Ltd.

(57) ABSTRACT

Disclosed herein is an inspecting apparatus including an illuminating unit adapted to be positioned in the periphery of a transparent member for illuminating the transparent member from the outside of the circumference thereof, an imaging unit adapted to be opposed to the transparent member for imaging the transparent member illuminated by the illuminating unit, and a displaying monitor for displaying an image obtained by the imaging unit.

9 Claims, 4 Drawing Sheets

(56) References Cited

U.S. PATENT DOCUMENTS

| | | | | |
|---|---|---|---|---|
| 2005/0067688 A1* | 3/2005 | Humpston | .......... | B81C 1/00293 257/704 |
| 2007/0165213 A1* | 7/2007 | Fang | .................... | G01N 21/552 356/239.1 |
| 2008/0200012 A1* | 8/2008 | Oba | ....................... | B23K 26/03 438/463 |
| 2011/0025838 A1* | 2/2011 | Ninomiya | .......... | G01N 21/9501 348/87 |
| 2011/0069313 A1* | 3/2011 | Sakai | ................. | G01N 21/9505 356/369 |
| 2012/0307236 A1* | 12/2012 | Ortner | ................ | G01N 21/9505 356/239.3 |
| 2014/0268117 A1* | 9/2014 | Kolchin | ............. | G01N 21/9505 356/237.3 |

* cited by examiner

INSPECTING APPARATUS AND LASER PROCESSING APPARATUS

BACKGROUND OF THE INVENTION

Field of the Invention

The present invention relates to an inspecting apparatus capable of detecting a crack present in a test piece formed of a transparent material, and also to a laser processing apparatus capable of detecting a crack present in a workpiece formed of a transparent material.

Description of the Related Art

There is disclosed in Japanese Patent Laid-open No. 2012-195472 a laser processing method for forming a laser processed groove on a wafer formed of a transparent material such as lithium tantalate ($LiTaO_3$) and lithium niobate ($LiNbO_3$), the front side of the wafer being partitioned by a plurality of division lines to define a plurality of separate regions where a plurality of surface acoustic wave (SAW) devices are individually formed. In this laser processing method, a pulsed laser beam is applied to the front side of the wafer along each division line, wherein the pulse width of the pulsed laser beam is set to 200 ps or less and the repetition frequency of the pulsed laser beam is set to 50 kHz or less. According to this laser processing method, a laser processed groove can be formed on the front side of the wafer along each division line without generating a crack in the wafer. After forming the laser processed groove on the front side of the wafer along each division line, an external force is applied along each division line to thereby divide the wafer into the individual SAW devices.

SUMMARY OF THE INVENTION

In the case of using the laser processing method disclosed in Japanese Patent Laid-open No. 2012-195472, any new crack is not generated in the wafer by the application of the laser beam. However, in the case that a minute crack has already been present in a certain device, there is a case that this minute crack may be extended by the application of the laser beam. In this case, there is a possibility that the crack may extend to the devices having no cracks at the time before the application of the laser beam.

It is therefore an object of the present invention to provide an inspecting apparatus having a simple configuration which can detect a crack present in a test piece formed of a transparent material. It is another object of the present invention to provide a laser processing apparatus having a simple configuration which can detect a crack present in a workpiece formed of a transparent material.

In accordance with an aspect of the present invention, there is provided an inspecting apparatus including illuminating means adapted to be positioned in the periphery of a transparent member for illuminating the transparent member from the outside of the circumference thereof; imaging means adapted to be opposed to the transparent member for imaging the transparent member illuminated by the illuminating means; and displaying means for displaying an image obtained by the imaging means.

Preferably, the inspecting apparatus further includes storing means for storing the image obtained by the imaging means and the position of a crack present in the transparent member, the crack being detected according to the image obtained by the imaging means.

In accordance with another aspect of the present invention, there is provided a laser processing apparatus including a chuck table for holding a transparent member; moving means for moving the chuck table in an X direction and a Y direction perpendicular to the X direction; laser beam applying means for applying a laser beam to the transparent member held on the chuck table; illuminating means adapted to be positioned in the periphery of the transparent member held on the chuck table for illuminating the transparent member from the outside of the circumference thereof; imaging means adapted to be opposed to the transparent member held on the chuck table for imaging the transparent member illuminated by the illuminating means; and displaying means for displaying an image obtained by the imaging means.

Preferably, while the chuck table holding the transparent member is being moved by the moving means, the whole area of one side of the transparent member is imaged by the imaging means. Preferably, the transparent member includes a wafer formed of lithium tantalate or lithium niobate.

According to the present invention, the illuminating means positioned in the periphery of the transparent member functions to illuminate the transparent member from the outside of the circumference thereof, and the imaging means opposed to the transparent member functions to image the transparent member illuminated by the illuminating means. Accordingly, a crack present in the transparent member can be imaged by the imaging means and an image obtained by the imaging means is displayed by the displaying means. Accordingly, the crack of the transparent member can be detected according to the image displayed by the displaying means.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
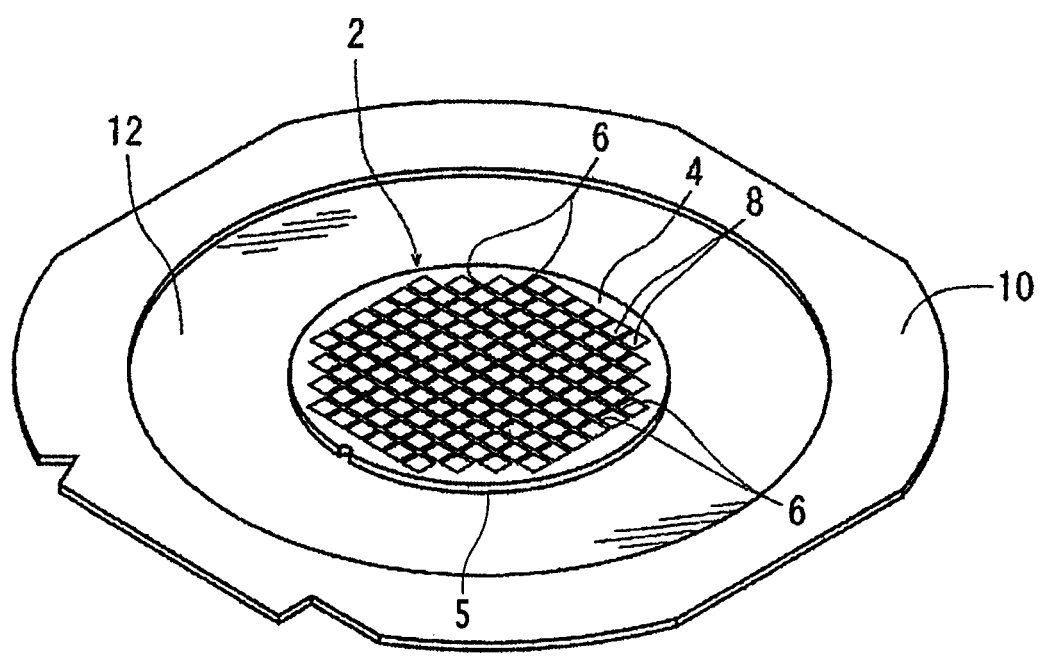
FIG. 1 is a perspective view of a wafer supported through an adhesive tape to an annular frame.

A preferred embodiment of the inspecting apparatus according to the present invention will now be described with reference to FIGS. 1 and 2, wherein a wafer 2 is used as a test piece to be inspected. The wafer 2 as the test piece shown in FIG. 1 is formed of a transparent hard and brittle material such as lithium tantalate and lithium niobate. The wafer 2 is circular in shape. The wafer 2 has a front side 4 and a back side 5. A plurality of crossing division lines 6 are formed on the front side 4 of the wafer 2 to thereby define a plurality of separate regions where a plurality of SAW devices 8 are individually formed. In this preferred embodiment, an adhesive tape 12 is fixed at its peripheral portion to an annular frame 10, and the back side 5 of the wafer 2 is attached to the adhesive tape 12. As a modification, the front side 4 of the wafer 2 may be attached to the adhesive tape 12.

Figure 2:
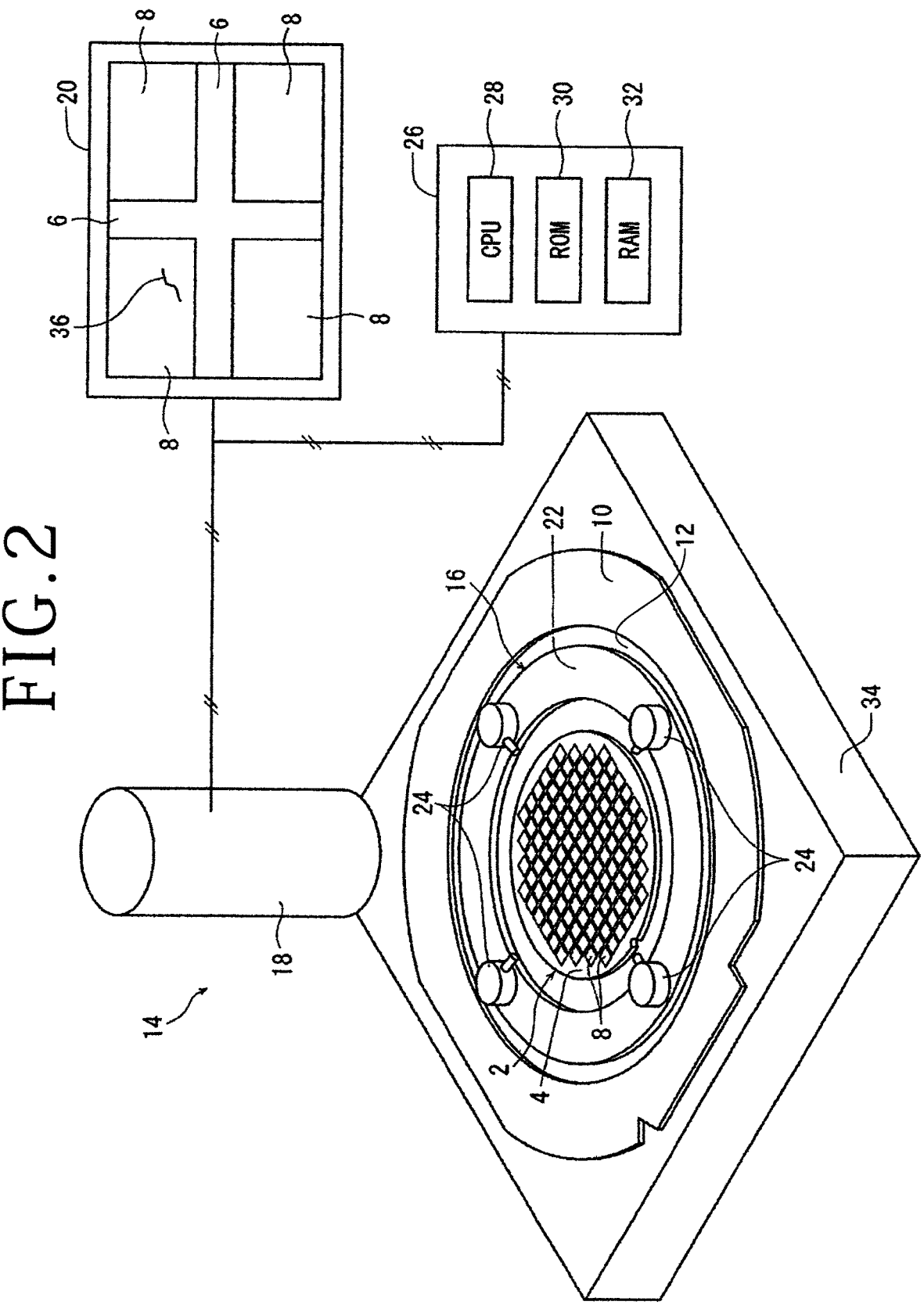
FIG. 2 is a schematic perspective view of an inspecting apparatus according to the present invention.

Referring to FIG. 2, there is shown an inspecting apparatus 14 according to this preferred embodiment. The inspecting apparatus 14 includes illuminating means 16, imaging means 18, and displaying means 20. The illuminating means 16 includes an annular plate 22 having an inner diameter larger than the diameter of the wafer 2 and a plurality of light sources 24 provided on one side (upper surface) of the annular plate 22 so as to be spaced in the circumferential direction of the annular plate 22. Preferably, the outer diameter of the annular plate 22 is smaller than the inner diameter of the annular frame 10. Each light source 24 functions to apply white light in the radially inward direction of the wafer 2. The imaging means 18 includes an ordinary imaging device (charge coupled device (CCD)) for imaging the wafer 2 by using visible light. An image signal obtained by the imaging means 18 is output to the displaying means 20 having a screen.

The inspecting apparatus 14 preferably further includes storing means. As shown in FIG. 2, control means 26 configured by a computer is connected to the imaging means 18. The control means 26 includes a central processing unit (CPU) 28 for performing operational processing according to a control program, a read only memory (ROM) 30 preliminarily storing the control program, and a random access memory (RAM) 32 for storing the results of computation etc. In this preferred embodiment, the storing means in the inspecting apparatus 14 is configured by the RAM 32 of the control means 26.

An inspecting step using the inspecting apparatus 14 will now be described. In inspecting the wafer 2, the wafer 2 supported through the adhesive tape 12 to the annular frame 10 is first placed on a suitable support 34 as shown in FIG. 2. Thereafter, the illuminating means 16 is set around the wafer 2, and the imaging means 18 is set above the wafer 2 so as to face the front side 4 of the wafer 2. Thereafter, the illuminating means 16 is operated to illuminate the wafer 2 from the outside of the outer circumference thereof, and the imaging means 18 is operated to image the wafer 2 illuminated above. By setting the illuminating means 16 and the imaging means 18 as mentioned above, it is possible to image a crack present in the wafer 2 formed of a transparent hard and brittle material. In imaging the wafer 2, the imaging means 18 is suitably moved to thereby image the whole area of the front side 4 of the wafer 2. An image obtained by the imaging means 18 is displayed on the screen of the displaying means 20. Accordingly, the crack (shown by reference numeral 36 in FIG. 2) in the wafer 2 can be detected according to the image displayed above. This inspection can be performed to the wafer 2 before dividing the wafer 2 into the SAW devices 8. Accordingly, the inspection in this preferred embodiment can be performed more efficiently as compared with the case of performing the inspection after dividing the wafer 2 into the SAW devices 8.

The inspection using the inspecting apparatus 14 may be performed before and after laser processing of applying a laser beam to each division line 6 to form a strength reduced portion along each division line 6. Accordingly, by performing the inspection using the inspecting apparatus 14 before and after laser processing, it is possible to verify the effect of the application of the laser beam on the extension of the crack. More specifically, in the case that the crack in the wafer 2 is detected by the inspection before laser processing, the image of an area including the crack and the position of the crack are stored into the RAM 32. Further, in performing the inspection after laser processing, the same area as the area (the area including the crack) stored into the RAM 32 before laser processing is imaged. Then, the image of this area and the position of the crack are stored into the RAM 32. Thereafter, the image stored before laser processing and the image stored after laser processing are compared with each other, thereby verifying the effect of the application of the laser beam on the extension of the crack.

After dividing the wafer 2 into the individual SAW devices 8, a screening operation is performed to separate the devices not including the cracks and the devices including the cracks. In performing this screening operation, the position of the crack stored in the RAM 32 is referred to, thereby eliminating the need for inspecting the presence or absence of the crack in each device. Accordingly, the efficiency of the screening operation can be improved.

While the inspection using the inspecting apparatus 14 is performed in the condition where the wafer 2 is supported through the adhesive tape 12 to the annular frame 10 in this preferred embodiment, the inspection using the inspecting apparatus 14 may be performed in the condition where the wafer 2 is not supported to the annular frame 10, but directly placed on a suitable support.

A preferred embodiment of the laser processing apparatus according to the present invention will now be described with reference to FIGS. 3 and 4, wherein the wafer 2 is used as a workpiece to be processed. In the following description, substantially the same parts as those of the inspecting apparatus 14 will be denoted by the same reference symbols, and the description thereof will be omitted.

Figure 3:
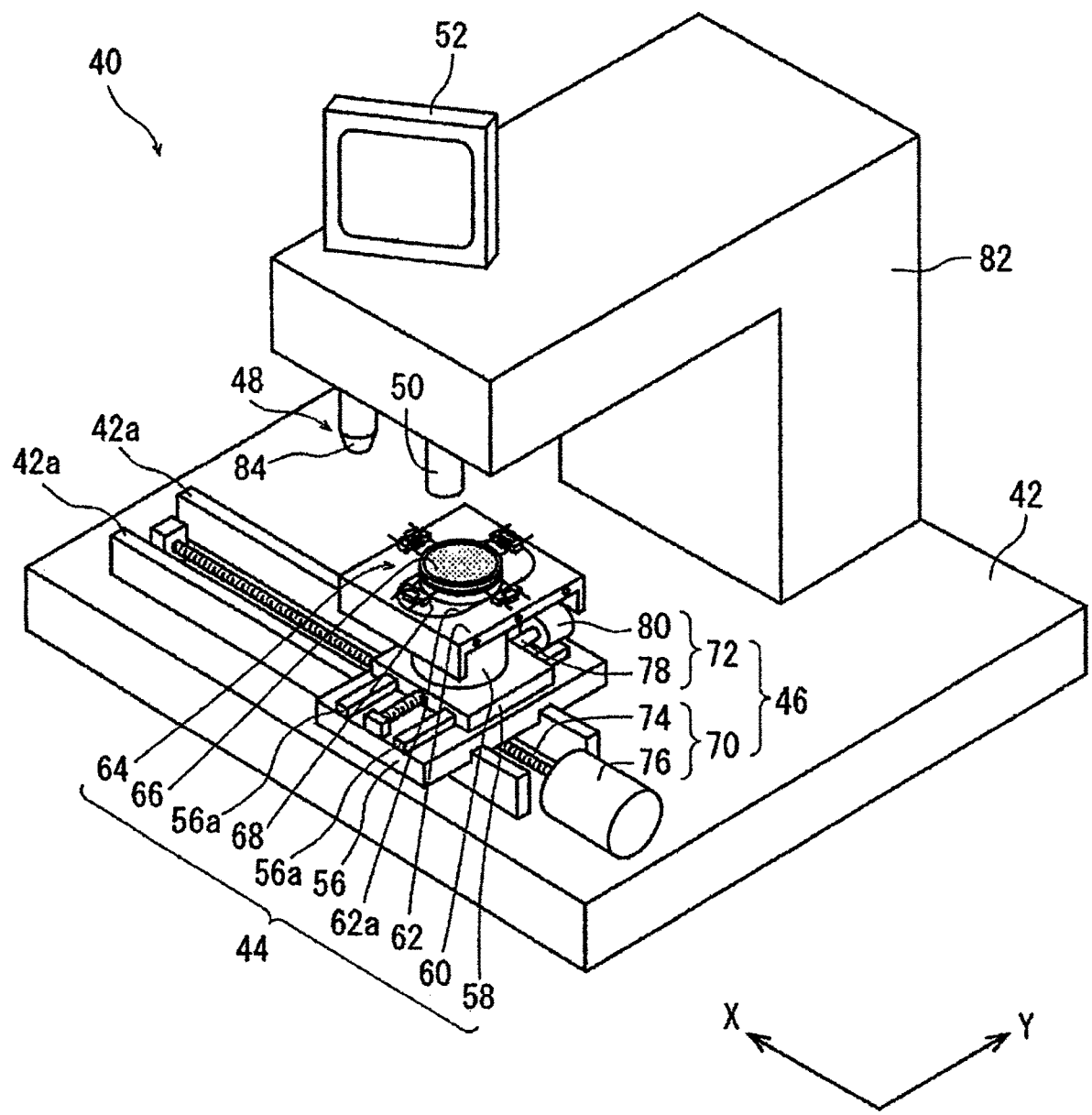
FIG. 3 is a perspective view of a laser processing apparatus according to the present invention.
Figure 4:
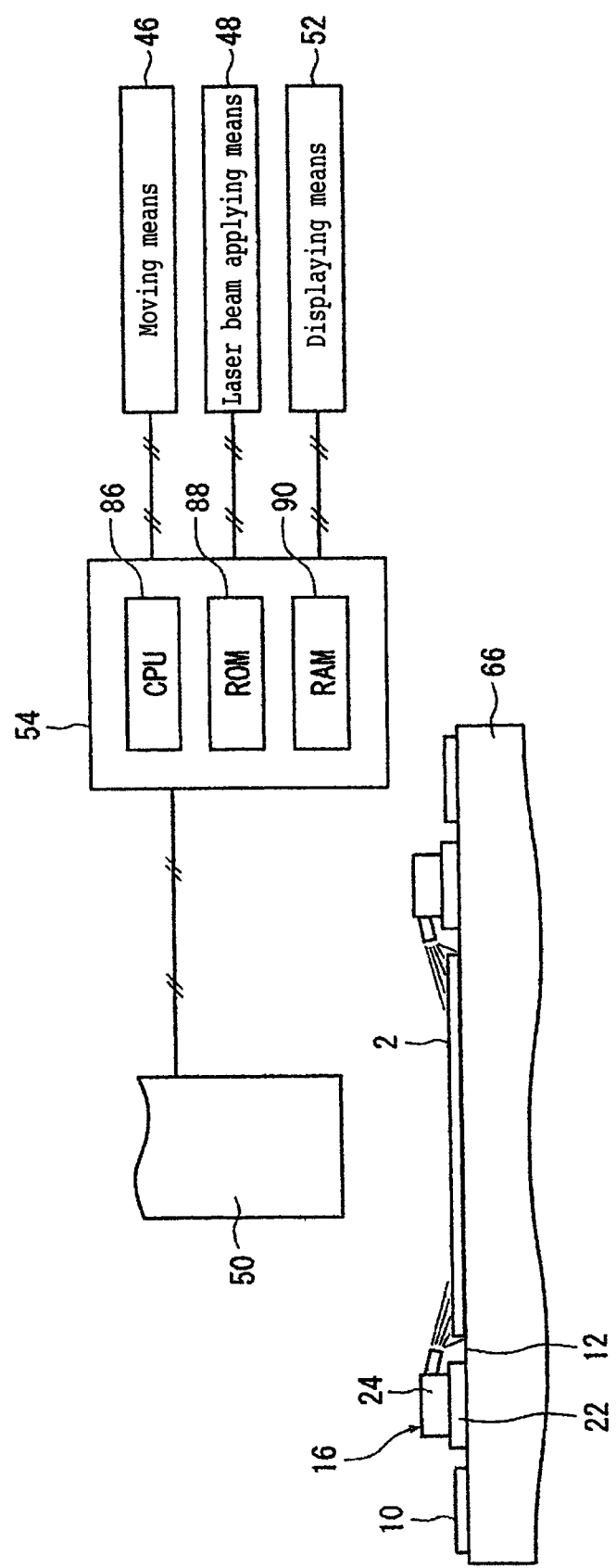
FIG. 4 is a schematic side view showing a condition that inspection is being performed by the laser processing apparatus shown in FIG. 3.

Referring to FIG. 3, there is shown a laser processing apparatus 40 according to this preferred embodiment. The laser processing apparatus 40 includes a base 42, holding means 44 for holding a workpiece, moving means 46 for moving the holding means 44, laser beam applying means 48 for applying a laser beam to the workpiece held on the holding means 44, imaging means 50, displaying means 52, and illuminating means 16. The laser processing apparatus 40 preferably further includes storing means. As shown in FIG. 4, the laser processing apparatus 40 further includes control means 54 configured by a computer. The storing means is configured by a RAM 90 constituting the control means 54 as will be hereinafter described.

The holding means 44 includes a rectangular X movable plate 56 mounted on the base 42 so as to be movable in an X direction, a rectangular Y movable plate 58 mounted on the X movable plate 56 so as to be movable in a Y direction, a cylindrical support 60 fixed to the upper surface of the Y movable plate 58, and a rectangular cover plate 62 fixed to the upper end of the support 60. The cover plate 62 is formed with an elongated hole 62a extending in the Y direction. A circular chuck table 64 is rotatably mounted on the upper end of the support 60 so as to extend upward through the elongated hole 62a of the cover plate 62. A circular vacuum chuck 66 is provided on the upper surface of the chuck table 64. The vacuum chuck 66 has a substantially horizontal holding surface. The vacuum chuck 66 is formed of a porous material. The vacuum chuck 66 is connected through a suction passage (not shown) formed in the support 60 to suction means (not shown). A plurality of clamps 68 are provided on the outer circumference of the chuck table 64 so as to be spaced in the circumferential direction thereof. The X direction is defined as the direction shown by an arrow X in FIG. 3, and the Y direction is defined as the direction shown by an arrow Y in FIG. 3, which is perpendicular to the X direction in an XY plane. The XY plane defined by the X direction and the Y direction is a substantially horizontal plane.

The moving means 46 includes X moving means 70, Y moving means 72, and rotating means (not shown). The X moving means 70 includes a ball screw 74 extending in the X direction on the base 42 and a motor 76 connected to one end of the ball screw 74. The ball screw 74 has a nut portion (not shown), which is fixed to the lower surface of the X movable plate 56. The X moving means 70 is operated in such a manner that the rotational motion of the motor 76 is converted into a linear motion by the ball screw 74 and this linear motion is transmitted to the X movable plate 56, so that the X movable plate 56 is moved in the X direction along a pair of guide rails 42a provided on the base 42. Similarly, the Y moving means 72 includes a ball screw 78 extending in the Y direction on the X movable plate 56 and a motor 80 connected to one end of the ball screw 78. The ball screw 78 has a nut portion (not shown), which is fixed to the lower surface of the Y movable plate 58. The Y moving means 72 is operated in such a manner that the rotational motion of the motor 80 is converted into a linear motion by the ball screw 78 and this linear motion is transmitted to the Y movable plate 58, so that the Y movable plate 58 is moved in the Y direction along a pair of guide rails 56a provided on the X movable plate 56. The rotating means is built in the support 60 to rotate the chuck table 64 with respect to the support 60.

An L-shaped casing 82 is provided on the base 42 at its rear end portion. The L-shaped casing 82 is composed of a vertical portion extending upward from the upper surface of the base 42 and a horizontal portion extending from the upper end of the vertical portion in a substantially horizontal direction. The laser beam applying means 48 includes pulsed laser beam oscillating means (not shown) built in the casing 82 and focusing means 84 provided on the lower surface of the front end portion of the casing 82. The imaging means 50 is also provided on the lower surface of the front end portion of the casing 82 so as to be spaced from the focusing means 84 in the X direction. The focusing means 84 and the imaging means 50 are positioned above the chuck table 64. The imaging means 50 includes an ordinary imaging device (CCD) for imaging a workpiece by using visible light, infrared light applying means for applying infrared light to the workpiece, an optical system for capturing the infrared light applied by the infrared light applying means, and an imaging device (infrared CCD) for outputting an electrical signal corresponding to the infrared light captured by the optical system (all the components being not shown). An image signal obtained by the imaging means 50 is output to the displaying means 52, which is mounted on the upper surface of the front end portion of the casing 82. As shown in FIG. 4, the control means 54 includes a CPU 86 for performing operational processing according to a control program, a ROM 88 preliminarily storing the control program, and the RAM 90 for storing the results of computation etc. The control means 54 is connected to the moving means 46, the laser beam applying means 48, the imaging means 50, and the displaying means 52 and functions to control the operation of these components.

An inspecting step and processing step using the laser processing apparatus 40 will now be described. A holding step is first performed in such a manner that the wafer 2 as a workpiece is held by the holding means 44. In the holding step, the wafer 2 supported through the adhesive tape 12 to the annular frame 10 is placed on the upper surface (holding surface) of the vacuum chuck 66 in the condition where the front side 4 of the wafer 2 is oriented upward. Thereafter, the suction means is operated to apply a vacuum to the upper surface of the vacuum chuck 66, thereby holding the back side 5 of the wafer 2 through the adhesive tape 12 on the upper surface of the vacuum chuck 66. Further, the annular frame 10 is fixed at its peripheral portion by the plural clamps 68. As similar to the case of the inspecting apparatus 14 mentioned above, the back side 5 of the wafer 2 is attached to the adhesive tape 12 fixed at its peripheral portion to the annular frame 10. However, the front side 4 of the wafer 2 may be attached to the adhesive tape 12.

After performing the holding step, an inspecting-before-processing step is performed in such a manner that the inspection of the wafer 2 is performed before laser processing. In performing the inspecting-before-processing step, the illuminating means 16 is placed through the adhesive tape 12 on the vacuum chuck 66 so as to surround the wafer 2 as shown in FIG. 4. Thereafter, the holding means 44 is moved by the moving means 46 so that the imaging means 50 comes into opposition to the front side 4 of the wafer 2. Thereafter, the illuminating means 16 is operated to illuminate the wafer 2 from the outside of the outer circumference thereof, and the imaging means 50 is next operated to image the wafer 2 illuminated above. By setting the illuminating means 16 and the imaging means 50 as mentioned above, it is possible to image a crack present in the wafer 2 formed of a transparent hard and brittle material. In imaging the wafer 2, the holding means 44 is suitably moved by the moving means 46 to thereby allow the imaging means 50 to image the whole area of the front side 4 of the wafer 2. An image obtained by the imaging means 50 is displayed on the screen of the displaying means 52. Accordingly, the crack in the wafer 2 can be detected according to the image displayed above. This inspection can be performed to the wafer 2 before dividing the wafer 2 into the SAW devices 8. Accordingly, the inspection can be performed more efficiently as compared with the case of performing the inspection after dividing the wafer 2 into the SAW devices 8. In the case that the crack in the wafer 2 is detected in this inspecting-before-processing step, the image of an area including the crack and the position of the crack are stored into the RAM 90 of the control means 54.

After performing the inspecting-before-processing step, the illuminating means 16 is removed from the vacuum chuck 66, and an alignment step is then performed to detect a laser beam applying position. In this alignment step, image processing such as pattern matching is performed by the control means 54. More specifically, the control means 54 suitably operates the moving means 46 according to the image of the wafer 2 obtained by the imaging means 50, thereby making the directions of the crossing division lines 6 parallel to the X direction and the Y direction and also making the alignment between the division lines 6 and the focusing means 84.

After performing the alignment step, a laser processing step is performed in the following manner. In performing the laser processing step, the moving means 46 is operated to move the holding means 44 to thereby position one end of a predetermined one of the division lines 6 directly below the focusing means 84. Thereafter, the laser beam applying means 48 is operated to apply a pulsed laser beam from the focusing means 84 to the predetermined division line 6, and at the same time the X moving means 70 is operated to move the holding means 44 in the X direction at a predetermined feed speed. When the other end of the predetermined division line 6 has reached the position directly below the focusing means 84, the operation of the laser beam applying means 48 is stopped and the operation of the X moving means 70 is also stopped. Accordingly, a strength reduced portion is formed along the predetermined division line 6. Thereafter, a plurality of strength reduced portions are similarly formed along all the other division lines 6.

In the case that the crack in the wafer 2 is detected in the inspecting-before-processing step mentioned above, an inspecting-after-processing step is performed after performing the laser processing step. In performing the inspecting-after-processing step, the moving means 46 is operated to move the holding means 44 to such a position that the imaging means 50 is opposed to the front side 4 of the wafer 2. Thereafter, the illuminating means 16 is operated to illuminate the wafer 2 from the outside of the outer circumference thereof. In this condition, the imaging means 50 is operated to image the same area as the area (the area including the crack) whose image has already been stored into the RAM 90 in the inspecting-before-processing step. Thereafter, the image of this area and the position of the crack are stored into the RAM 90. Thereafter, the image stored in the inspecting-before-processing step and the image stored in the inspecting-after-processing step are compared with each other, thereby verifying the effect of the application of the laser beam on the extension of the crack. Further, by referring to the position of the crack stored in the RAM 90, the efficiency of the screening operation can be improved in screening the individual SAW devices 8 divided from the wafer 2.

While the illuminating means 16 in the laser processing apparatus 40 is similar to that of the inspecting apparatus 14 in this preferred embodiment, a plurality of light sources may be provided on the cover plate 62 radially outside the chuck table 64 so as to be spaced in the circumferential direction thereof.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An inspecting apparatus comprising:
a plurality of light sources positioned in the periphery of a transparent member for illuminating said transparent member from the outside of the circumference thereof, wherein the transparent member includes an upper surface and a lower surface, with the circumference connecting the upper surface to the lower surface, wherein the plurality of light sources project light into said transparent member through the upper surface and the circumference, wherein said light sources are each configured and arranged to apply white light to said transparent member;
imaging means adapted to be opposed to said transparent member for imaging said transparent member illuminated by said plurality of light sources; and
displaying means for displaying an image obtained by said imaging means; and
an annular plate having an inner diameter that is larger than an outer diameter of the transparent member, wherein said plurality of light sources are spaced from each other and located on a surface of said annular plate, wherein the transparent member is attached to an adhesive tape that is fixed at its outer peripheral portion to an annular frame, and further wherein said annular plate has an outer diameter that is smaller than an inner diameter of the annular frame, and
wherein said annular plate is seated upon the adhesive tape.

2. The inspecting apparatus according to claim 1, further comprising:
storing means for storing the image obtained by said imaging means and the position of a crack present in said transparent member, said crack being detected according to the image obtained by said imaging means.

3. A laser processing apparatus comprising:
a chuck table for holding a transparent member;
moving means for moving said chuck table in an X direction and a Y direction perpendicular to said X direction;
laser beam applying means for applying a laser beam to said transparent member held on said chuck table;
a plurality of light sources positioned in the periphery of said transparent member held on said chuck table for illuminating said transparent member from the outside of the circumference thereof, wherein the transparent member includes an upper surface and a lower surface, with the circumference connecting the upper surface to the lower surface, wherein the plurality of light sources project light into said transparent member through the upper surface and the circumference;
imaging means adapted to be opposed to said transparent member held on said chuck table for imaging said transparent member illuminated by said plurality of light sources;
an annular plate having an inner diameter that is larger than an outer diameter of the transparent member, wherein said plurality of light sources are spaced from each other and located on a surface of said annular plate, wherein the transparent member is attached to an adhesive tape that is fixed at its outer peripheral portion to an annular frame, and further wherein said annular plate has an outer diameter that is smaller than an inner diameter of the annular frame, wherein said annular plate is seated upon the adhesive tape;
displaying means for displaying an image obtained by said imaging means; and
control means, including a central processing unit, configured and arranged for controlling operation of said moving means, said laser beam applying means, said imaging means and said displaying means, wherein said control means also includes a storing means for storing images obtained by said imaging means,
wherein said control means is configured and arranged for storing a first image obtained by said imaging means before laser processing said transparent member with said laser beam applying means and a position of a crack, and for storing a second image, of the position including the crack, obtained by said imaging means after laser processing said transparent member with said laser beam applying means; and
wherein said control means is configured and arranged to compare the first image with the second image to determine whether the laser processing had an effect on the crack.

4. The laser processing apparatus according to claim 3, wherein while said chuck table holding said transparent member is being moved by said moving means, the whole area of one side of said transparent member is imaged by said imaging means.

5. The laser processing apparatus according to claim 3, wherein said transparent member includes a wafer formed of lithium tantalate or lithium niobate.

6. The laser processing apparatus according to claim 3, wherein said light sources are each configured and arranged to apply white light to said transparent member.

7. The laser processing apparatus according to claim 3, wherein the plurality of light sources directly project light into said transparent member.

8. The inspecting apparatus according to claim 1, wherein the plurality of light sources directly project light into said transparent member.

9. A laser processing apparatus comprising:

a chuck table for holding a transparent member;

moving means for moving said chuck table in an X direction and a Y direction perpendicular to said X direction;

laser beam applying means for applying a laser beam to said transparent member held on said chuck table;

a plurality of light sources positioned in the periphery of said transparent member held on said chuck table for illuminating said transparent member from the outside of the circumference thereof, wherein the transparent member includes an upper surface and a lower surface, with the circumference connecting the upper surface to the lower surface, wherein the plurality of light sources project light directly into said transparent member through the upper surface and the circumference;

imaging means adapted to be opposed to said transparent member held on said chuck table for imaging said transparent member illuminated by said plurality of light sources;

an annular plate having an inner diameter that is larger than an outer diameter of the transparent member, wherein said plurality of light sources are spaced from each other and located on a surface of said annular plate, wherein the transparent member is attached to an adhesive tape that is fixed at its outer peripheral portion to an annular frame, and further wherein said annular plate has an outer diameter that is smaller than an inner diameter of the annular frame, wherein said annular plate is seated upon the adhesive tape;

displaying means for displaying an image obtained by said imaging means; and control means, including a central processing unit, configured and arranged for controlling operation of said moving means, said laser beam applying means, said imaging means and said displaying means, wherein said control means also includes a storing means for storing images obtained by said imaging means, wherein said control means is configured and arranged for storing a first image obtained by said imaging means before laser processing said transparent member with said laser beam applying means and a position of a crack, and for storing a second image, of the position including the crack, obtained by said imaging means after laser processing said transparent member with said laser beam applying means.

* * * * *